US010853594B2

(12) United States Patent
Valencia et al.

(10) Patent No.: US 10,853,594 B2
(45) Date of Patent: Dec. 1, 2020

(54) LOCKOUT TAGOUT SYSTEM AND METHOD

(71) Applicant: ROCKWELL AUTOMATION TECHNOLOGIES, INC., Mayfield Heights, OH (US)

(72) Inventors: Joseph E. Valencia, Norristown, PA (US); Charles W. Grab, Norristown, PA (US); Jeffrey T. Eker, Jr., Marlborough, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 36 days.

(21) Appl. No.: 15/692,958

(22) Filed: Aug. 31, 2017

(65) Prior Publication Data

US 2019/0065795 A1   Feb. 28, 2019

(51) Int. Cl.
| | |
|---|---|
| *H01H 9/28* | (2006.01) |
| *G06K 7/10* | (2006.01) |
| *F16P 3/14* | (2006.01) |
| *H01H 9/16* | (2006.01) |

(52) U.S. Cl.
CPC .......... *G06K 7/10366* (2013.01); *F16P 3/147* (2013.01); *G06K 7/10297* (2013.01); *H01H 9/281* (2013.01); *H01H 9/286* (2013.01); *H01H 9/167* (2013.01); *H01H 9/168* (2013.01); *H01H 2300/032* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,181,256 B1 * | 1/2001 | Fitzsimmons | ........... | H01H 3/22 340/12.55 |
| 9,150,134 B2 * | 10/2015 | Westlund | .................. | B60P 1/00 |
| 9,484,163 B2 * | 11/2016 | Oneufer | ................ | H01H 9/223 |
| 9,501,046 B2 * | 11/2016 | Kalous | ..................... | G05B 1/01 |
| 9,801,749 B2 * | 10/2017 | Hingston | ............. | A61F 5/0076 |
| 9,804,590 B2 * | 10/2017 | Michalscheck | ...... | G05B 19/406 |

(Continued)

FOREIGN PATENT DOCUMENTS

WO   2016004278 A1   1/2016

OTHER PUBLICATIONS

The Extended European Search Report for EP Application No. 18191165.2-1204/3451356 dated Jul. 2, 2019. pp. 1-10.

*Primary Examiner* — Thien M Le
*Assistant Examiner* — April A Taylor
(74) *Attorney, Agent, or Firm* — Fletcher Yoder, P.C.

(57) ABSTRACT

A manually operated disconnect maintains a machine/process in a de-energized state. The disconnect employs a sensor that automatically detects, via wireless communication, a lock affixed to the disconnect that locks the disconnect in an open state. Processing circuitry coupled to the sensor determines lockout tagout data, such as identification of a user associated with the lock, a time of application of the lock, and data identifying and/or locating the disconnect or a machine/process to which the disconnect provides power when in a closed state. Memory circuitry coupled to the processing circuitry stores the lockout tagout data, and holds it available for user review, transmission, analysis, reporting, and so forth.

18 Claims, 5 Drawing Sheets

(56) References Cited

U.S. PATENT DOCUMENTS

| | | | | |
|---|---|---|---|---|
| 2003/0231102 A1* | 12/2003 | Fisher | ................ | G07C 9/00103 |
| | | | | 340/5.73 |
| 2008/0156623 A1* | 7/2008 | Sukarukoff | ............ | H01H 3/163 |
| | | | | 200/61.68 |
| 2011/0254659 A1* | 10/2011 | Bowen | ................ | G07C 9/00158 |
| | | | | 340/5.6 |
| 2014/0028443 A1* | 1/2014 | Ebner | ................ | G07C 9/00571 |
| | | | | 340/10.1 |
| 2020/0149321 A1* | 5/2020 | Griffin | ................ | E05B 63/0052 |

\* cited by examiner

FIG. 4

| LOCK-OUT-TAG-OUT TRACKING SHEET | | | | |
|---|---|---|---|---|
| DATE | TIME IN | TIME OUT | MACHINE | EMPLOYEE |
| 1/4/2015 | 6:21 | 6:31 | EXTRUDER | S. SMITH |
| 1/15/2015 | 9:15 | 9:48 | EXTRUDER | S. SMITH |
| 1/19/2015 | 14:26 | 15:16 | ROLLER | R. RAO |
| 1/31/2015 | 11:05 | 13:31 | EXTRUDER | B. BROWN |
| 2/7/2015 | 8:57 | 9:26 | ROLLER | R. RAO |
| 2/15/2015 | 10:22 | 10:43 | ROLLER | S. SMITH |
| 2/27/2015 | 12:18 | 1:02 | EXTRUDER | B. BROWN |
| 3/18/2015 | 13:51 | 15:32 | ROLLER | S. SMITH |
| 3/19/2015 | 10:36 | 10:59 | ROLLER | R. RAO |
| 4/3/2015 | 10:49 | 11:15 | EXTRUDER | B. BROWN |
| 4/10/2015 | 10:02 | 10:20 | EXTRUDER | B. BROWN |
| 4/29/2015 | 8:20 | 9:13 | ROLLER | S. SMITH |
| 5/3/2015 | 11:55 | 12:37 | ROLLER | S. SMITH |
| 5/20/2015 | 22:10 | 22:35 | EXTRUDER | B. BROWN |
| 6/13/2015 | 17:31 | 18:02 | ROLLER | R. RAO |

LOCKOUT TAGOUT SYSTEM AND METHOD

BACKGROUND

The present disclosure relates to lockout, tagout systems used in electrical systems, particularly those of automation applications.

A wide variety of electrical power systems may require removal of power from time to time, such as for maintenance, non-use, and so forth. In many systems, power is removed from equipment by mechanical operation of a disconnect. Disconnects commonly allow for manual opening and closing of conductive paths between a power source and downstream equipment by moving a lever arm or rotary knob between powered (closed) positions and unpowered (open) positions. In three-phase applications, for example, power for all three phases is interrupted by separation of conductive elements within a disconnect housing upon movement of the actuator to the open position.

An important part of the practice of disabling machinery or equipment is the lockout tagout process. This process includes removing power from the equipment by operation of the disconnect, and then placing a physical lock on the disconnect. Many industries and organizations have lockout tagout procedures adapted to their environment, and most have some form of logging of lockout tagout operations. This is mostly done by written logs or manual entries which are susceptible to human error, or falsification, or that in general provide little or no ability to assimilate or analyze lockout tagout activities, or to communicate them easily to management.

BRIEF DESCRIPTION

In one embodiment, a manually operated disconnect may include a sensor configured to automatically detect, via wireless communication, a lock affixed to the disconnect that locks the disconnect in an open state. The disconnect may also include processing circuitry coupled to the sensor and configured to determine lockout data including at least a user associated with the lock, a time of application of the lock, and data identifying or locating the disconnect or a machine to which the disconnect provides power when in a closed state. The disconnect may also include memory circuitry coupled to the processing circuitry to store the lockout data.

In another embodiment, a system may include a sensor retrofittable onto an in-service manual disconnect and configured to automatically detect via wireless communication a lock affixed to the disconnect that locks the disconnect in an open state. The system may also include processing circuitry retrofittable into an enclosure of the disconnect and, in operation, coupled to the sensor and configured to determine lockout data including at least a user associated with the lock, a time of application of the lock, and data identifying or locating the disconnect or a machine to which the disconnect provides power when in a closed state. The system may also include memory circuitry retrofittable into the enclosure and, in operation, coupled to the processing circuitry to store the lockout data.

In another embodiment, a method may include detecting via wireless communication a lock affixed to a disconnect that locks the disconnect in an open state, and determining lockout data including at least a user associated with the lock, a time of application of the lock, and data identifying or locating the disconnect or a machine to which the disconnect provides power when in a closed state. The method may also include storing the lockout data.

DRAWINGS

These and other features, aspects, and advantages of the present invention will become better understood when the following detailed description is read with reference to the accompanying drawings in which like characters represent like parts throughout the drawings, wherein:

FIG. 4 is an example log table illustrating an analysis of data received by utilizing aspects of the disclosed techniques;

DETAILED DESCRIPTION

Figure 1:
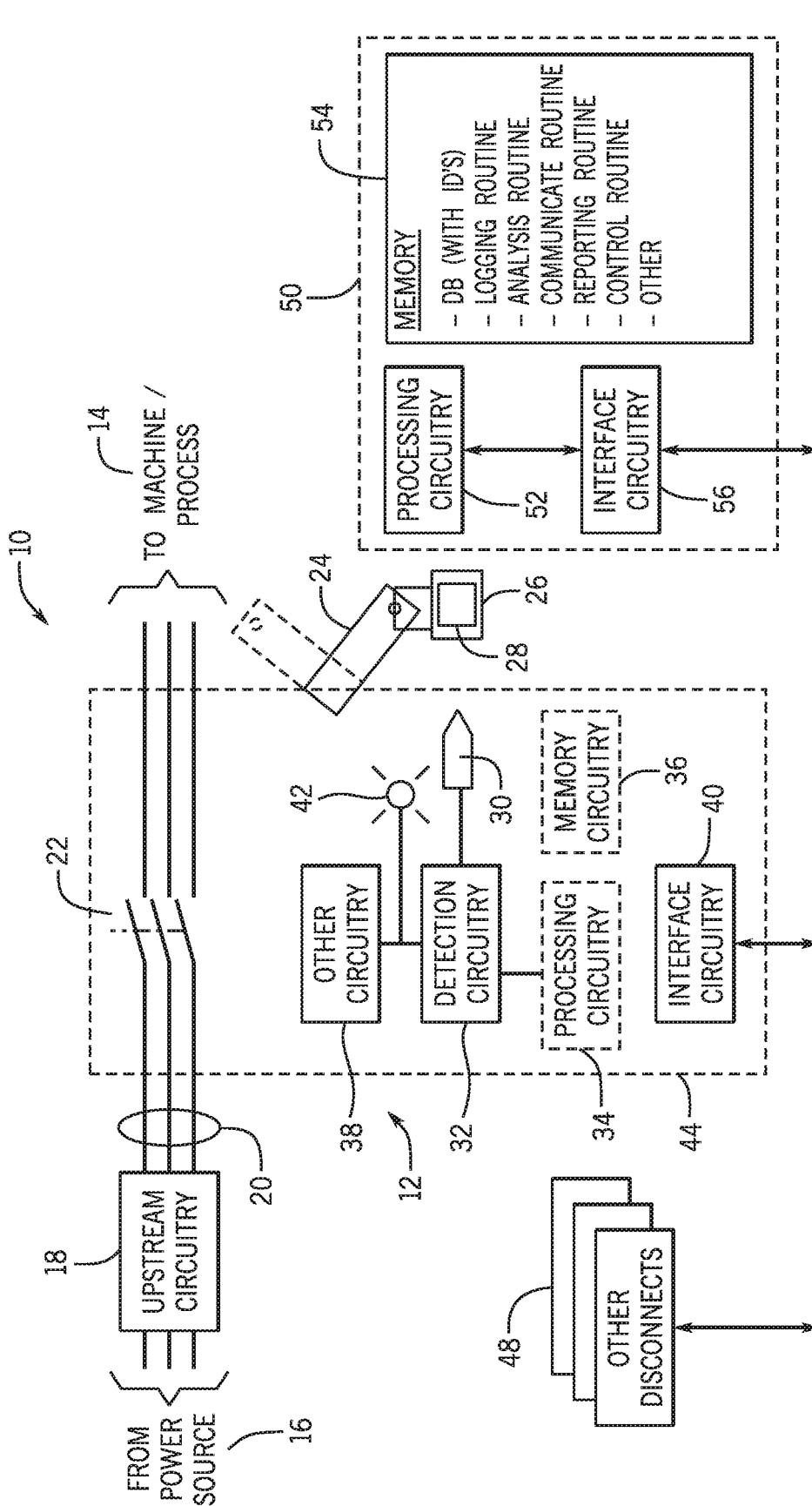
FIG. 1 is a diagrammatical view of an automation system in the form of a machine or process that can be de-energized utilizing aspects of the disclosed techniques.

FIG. 1 illustrates an automation system 10 utilizing an electrical disconnect 12 to isolate a machine/process 14 from a power source 16. Upstream circuitry 18 may also be utilized between the power source 16 and the machine/process 14. Such upstream circuitry 18 may include, for example, circuit protective devices, fuses, circuit breakers, sensors, and so forth. Conductors 20 consisting of single or three phase power transmit electrical power to the machine/process 14. Contacts 22 within the disconnect 12 connect or disconnect the current carrying conductors 20 from the machine/process 14. The contacts may be opened or closed via an actuator/handle 24 easily accessed by a worker. In some applications other actuators may be employed, such as rotary actuators.

The lockout tagout procedure allows for removing power from the machine/process 14, such as for maintenance or service, and placing a lock 26 on the disconnect actuator. If multiple workers are to be servicing the machine/process 14, then they typically each place a lock 26 on the disconnect actuator, to which no other worker has the key. Additionally, a tag 28 should be employed by each worker either on the lock 26 or separately on the machine/process 14 to at least identify that worker as locking out the disconnect. Tags 28 may also include information such as time of disconnect, date, reason for disconnect, or other information requested or required by the lockout tagout procedures established for the industry, managing company of the machine/process 14, or machine/process manufacturer. In many cases an attempt to restart the machine/process 14 with the power disconnected is required in a "lock, tag, try" procedure, before service of the machine/process.

As mentioned above, multiple pieces of information such as worker identification, time, and date, may be described by a tag 28. In addition to this information being known at the disconnect 12, it may also be desired or required to keep a record of disconnect and lockout data. In the past, these records were created separately and by manual entry, while as described below, automated record keeping is enabled by the present techniques.

The present techniques may employ a disconnect 12 that allows automatic logging by use of one or more sensors 30 within or associated with the disconnect. The sensors 30, along with detection circuitry 32, may be employed to register signals or data generated based upon the lock 26 or tag 28. The detection circuitry 32 may be connected to processing circuitry 34 and memory circuitry 36 located at the disconnect 12, or the raw data received from the sensor 30 may be processed elsewhere. The processing circuitry 34 may include one or more processors, which may be any suitable types, such as field programmable gate arrays, multi-core processors, or any other suitable processing circuits. The processing circuitry 34 is coupled to memory circuitry 36 that stores a range of configuration routines, operating routines, settings, and so forth, and particularly, signals and data relating to the disconnect, the lock applied to it, and any other useful information pertaining to the lockout event, as discussed below. The memory circuitry 36 may be of any suitable type, including volatile and non-volatile memory.

The detection circuitry 32 may also connect to other circuitry 38 within the disconnect relating to machine/process 14 operation, power status, and/or monitoring and/or control. Interface circuitry 40 may also be included to facilitate communication with devices outside of the disconnect 12. This interface circuitry 40 may be standalone or integrated into detection circuitry 32, processing circuitry 34, or other circuitry 38. Additionally, an indicator 42 displaying the state of the disconnect 12 and lockout tagout status may also be employed at the disconnect. Such an indicator 42 may comprise one or more lights, a display, readout, speaker, and/or any such visual or auditory indications of disconnect and/or lockout tagout status. The indicator 42 may also be combined with the interface circuitry 40 and/or the other circuitry 38, to give indications of the states of other devices affiliated with the machine/process, and/or to provide a human interface such as a keyboard, mouse, or other peripheral device to directly input lockout tagout information or configuration details. Moreover, the entirety of the disconnect 12 may be encased in an enclosure 44. In some cases, the enclosure and other basic parts of the disconnect may be conventional, and the present disclosure contemplates that in such cases, the components for detection of the lock, processing of sensed signals, and communication of lockout tagout data may be retrofitted into or on conventional disconnect enclosures.

Furthermore, the disconnect 12 may be connected to a network 46 that runs throughout the automation system 10 and links the disconnect, along with one or more other disconnects 48, if present, to monitoring circuitry 50. The interface circuitry 40 of each disconnect 12 may incorporate Ethernet connections, serial connections, other wired or wireless connections, or utilize a combined connection that incorporates other circuitry 38 into the network 46 and connects to monitoring circuitry 50. The monitoring circuitry 50 facilitates monitoring and logging of the lockout tagout data, and may comprise separate processing circuitry 52 and memory 54. As in the case of the disconnect 12, the processing circuitry 52 may include one or more processors, which may be any suitable types, such as field programmable gate arrays, multi-core processors, or any other suitable processing circuits. The processing circuitry 52 is coupled to memory 54 that stores a range of configuration routines, operating routines, settings, and so forth. Here again, the memory circuitry 36 may be of any suitable type, including volatile and non-volatile memory. The memory may also store the lockout tagout data as indicated above.

The processing circuitry 52 may analyze raw signals from the detection circuitry 32 or preprocessed signals from the processing circuitry 34 of the disconnect 12. The processed data may then be stored in memory 54. The memory 54 may store logging routines, analysis routines, communication routines, reporting routines, control routines, and so forth, as well as the results of such routines along with a databases of workers and/or identifiers for workers such an employee number and/or name. It should be borne in mind that the lockout tagout-related data indicated here is representative and exemplary only, and many other types of data may be determined, analyzed, stored, and reported, depending upon the information available and the needs or desired of the application or organization.

The monitoring circuitry 50 may also include an interface circuitry 56 to connect the monitoring circuitry to the network 46. Additionally, the interface circuitry 56 may include a human interface such as a display, keyboard, or other peripherals to facilitate viewing of disconnect 12 status or other results of processing and analysis. The monitoring circuitry 50, processing circuitry 52, and/or memory 54 may be located remotely on or off the network 46. For example, the processing and memory could be handled on a remote server, and clients of that server, being stationary or mobile, may access the data for onsite or remote processing, storage, backup, retrieval, and viewing.

Figure 2A:
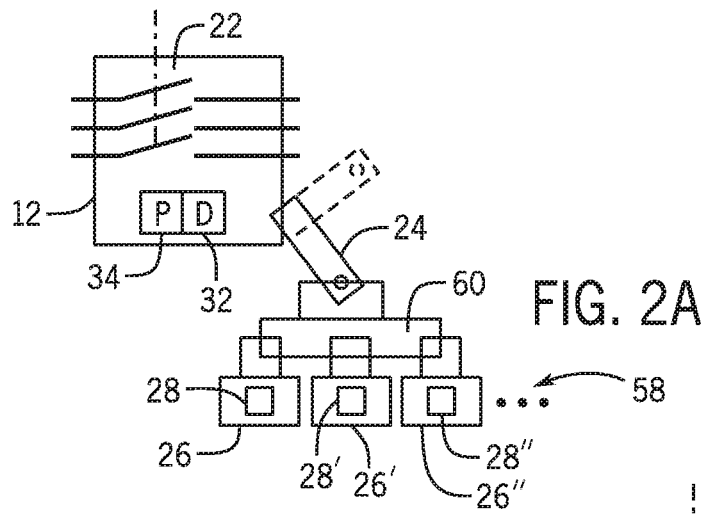
FIG. 2A is a diagrammatical view of certain of the components of FIG. 1.

To accurately acquire lockout tagout data, the detection circuitry 32 detects the presence of locks 26 and/or tags 28. In the case where multiple workers are servicing a machine/process 14, multiple locks 58 may be implemented as illustrated in FIG. 2A. A first worker would be identified by tag 28 and retain the key to a lock 26 that no other worker could unlock, a second worker would be identified by tag 28' and retain the key to a lock 26' that no other worker could unlock, a third worker would be identified by tag 28" and retain the key to a lock 26" that no other worker could unlock, and so on. If the disconnect 12 being utilized cannot support the multiple locks 58 required, a gang device 60 may be used to expand compatibility.

Figure 2B:
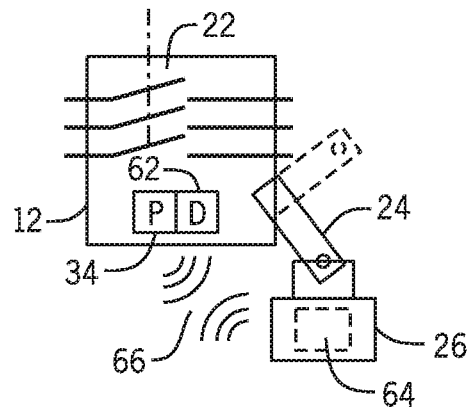
FIG. 2B is another diagrammatical view of certain of the components of FIG. 1.

As illustrated in FIG. 2B, the detection circuitry 32 and sensor 30 may comprise a transmitting/receiving detector 62, connected to processing circuitry 34, to identify a transmitting/receiving tag 64 on the lock 26. The wireless signals 66 between the transmitting/receiving detector 62 and tag 64 may be any suitable type of wireless communication such as radio frequency identification (RFID), near field communication (NFC), Bluetooth® (e.g., as standardized by IEEE 802.15.1), or Wi-Fi. Both RFID and NFC types of wireless communication allow for the use of passive technologies that do not require a power source for the lock 26 or tag 64. Although active RFID and NFC systems may be utilized, the adoption of passive locks 26 or tags 64 may be preferable due to the convenience of not requiring a power source (e.g., battery) that must be physically plugged in or charged periodically, as well as their relatively inexpensive parts. Active RFID and NFC systems utilize two way communication, however, the passive systems simply detect antenna loops in close proximity. The uniqueness of these loops or their programmed contents allow each RFID or NFC tag 64 to be detected and identified by the RFID or NFC detector 62 respectively. But it should be noted that the present techniques may be used with simple tags, such as bar codes or other machine readable indicia that may uniquely identify the lock (and where desired permit identification of additional information such as the person associated with the lock, and so forth).

Bluetooth and Wi-Fi technologies may require power sources, but their signal range may extend further from the disconnect 12 to allow communication with other devices if desired. Bluetooth technology may be further desired over Wi-Fi due to the possibility of a much smaller current draw. A smaller current draw would be very preferable when utilizing a battery because of the increased runtime of the battery or decreased cost associated with using a smaller battery. If a battery was employed in a lock 26 or tag 64, a wireless charging method such as inductive charging may also be utilized to maintain the battery while the transmitting/receiving tag 64 communicates with the detector 62. Additionally, a combination detector 62 that allows multiple methods for receiving the wireless signals 66 may recognize RFID, NFC, Bluetooth, and/or Wi-Fi signals and report all of them concurrently. In such a case, the transmitting/receiving tags 64 may use one of a multitude of or a combination of wireless communication technologies. If multiple locks 58 are used, they need not all use the same communication technology.

The transmitting/receiving tag 64 may be inherently built into the lock 26, or affixed to the lock 26 externally. It should also be noted that although the present embodiment illustrates a tag 28 affixed to or inherent within a lock 26, the tag and lock may be employed as separate elements that do not require the other to function. For example, the lock 26 may itself include a wireless transmitter/receiver apart from a tag 28. Likewise, the lock 26 may be placed on the disconnect 12 without a tag 28, and a transmitting/receiving tag 64 may be implemented apart from the lock.

Figure 2C:
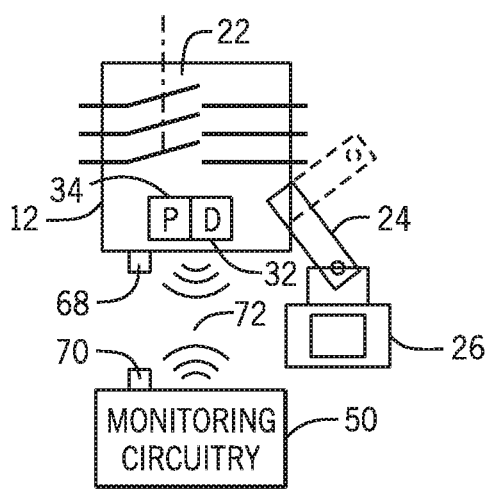
FIG. 2C is another diagrammatical view of certain of the components of FIG. 1.

As mentioned above, the disclosed system may be applied as a retrofit option. To accommodate legacy disconnects 12 that do not have the automated lockout tagout components disclosed, a retrofit of the automated lockout tagout feature may be employed. Such a retrofit may include detection circuitry 32, processing circuitry 34, and the employment of locks 26 or tags 28 capable of wireless signal transmission 66. Retrofits may be accomplished by installing the detection circuitry 32 inside, on or in close proximity to the disconnect 12. FIG. 2C illustrates an additional embodiment of the disconnect 12 that may be implemented in new installations or aid in retrofits. The detection circuitry 32 and processing circuitry 34 may also incorporate a transmitting/receiving network interface 68 to communicate with a transmitter/receiver 70 connected to the monitoring circuitry 50 via wireless signals 72. The detection circuitry 32 and/or the monitoring circuitry 50 may be wirelessly connected to the network 64, or the detection circuitry 32 may directly communicate with the monitoring circuitry 50 via wireless signals 72 such as Wi-Fi or any suitable wireless data transmission protocol.

The use of wireless signals 72 to send lockout tagout data to the monitoring circuitry 50 may assist retrofits or new installations by reducing the required wiring for the disconnect 12 to the network 46. Any required power for the detection circuitry 32, or processing circuitry 34 may be obtained directly from within the disconnect 12 (e.g., from one phase of incoming power) or another power source. Additionally, using the tag 64 as the source of communication between a lock 26 and the detector 62 may further aid retrofits by allowing easily affixed RFID or NFC antenna loops or chips to be adhered to existing locks 26. Adherence may take the form of glue, epoxy, solder, or any other suitable means for affixing the antenna loops, chips or any other type of tag to the lock 26.

Figure 2D:
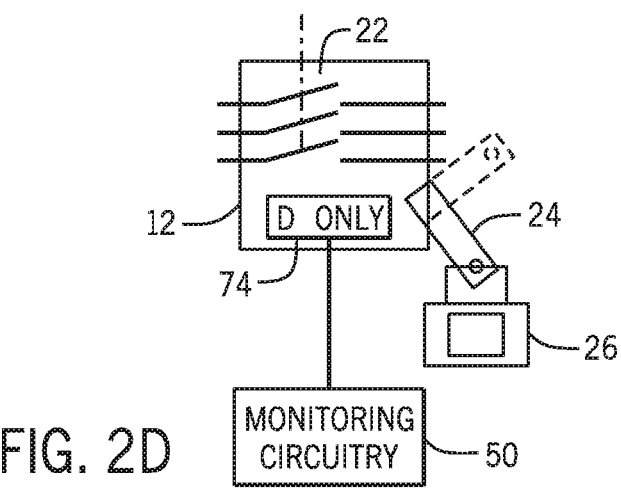
FIG. 2D is another diagrammatical view of certain of the components of FIG. 1.

FIG. 2D illustrates a further embodiment, either integrated into the disconnect or retrofit, that employs detection circuitry 74 only at the disconnect 12. In this case, the detection circuitry 74 does not process the signal received from the lock 26 or tag 28, but sends the signal elsewhere (e.g., to monitoring circuitry 50) for processing. Although the embodiment is shown as utilizing a wired connection, wireless connections such as those described above and depicted in FIG. 2C may also be employed.

If space and/or placement does not permit proper detection of locks 26 by the detection circuitry 32 during retrofits, or if deemed desirable on a new installation, transmitting/receiving tags 64 may be utilized apart from the locks as described above. The detection circuitry 32 may be installed on or in close proximity to the disconnect in a location that would not provide easy wireless communication to where the locks 26 are positioned. In turn, the transmitting/receiving tags 64 may then be placed at the detection circuitry 32 to facilitate automatic logging of the service and/or tagout of the machine/process 14. If desired or required by the lockout tagout procedures, the locks 26 may still have some identifying marks or tags 28 associated with respective workers.

In some instances a master lock 26 may be implemented instead of multiple locks 58 or a gang device 60. Even when multiple workers will be servicing one machine/process 14, a single lock 26 on each of the disconnects 12 associated with the machine/process may be desired. In general, such cases include when multiple disconnects 12 are required, thus increasing the total number of locks 26 required to an unreasonable amount; when multiple locks 58 are not physically capable of being affixed to the disconnect; and when more workers are servicing the machine/process than a gang device 60 may permit. To alleviate these potential difficulties, a group lockbox may be employed. A single lock 26 is placed on each disconnect 12, and the keys for the locks are placed in the group lockbox. Each worker then places a lock 26, to which no other worker has the key, on the group lockbox, thus locking the keys to the one or more master locks. Since the group lockbox may be mobile and/or too far from the detection circuitry 32 built into or onto the disconnects 12, transmitting/receiving tags 64 may be utilized apart from the locks 12 as discussed above.

Figure 3:
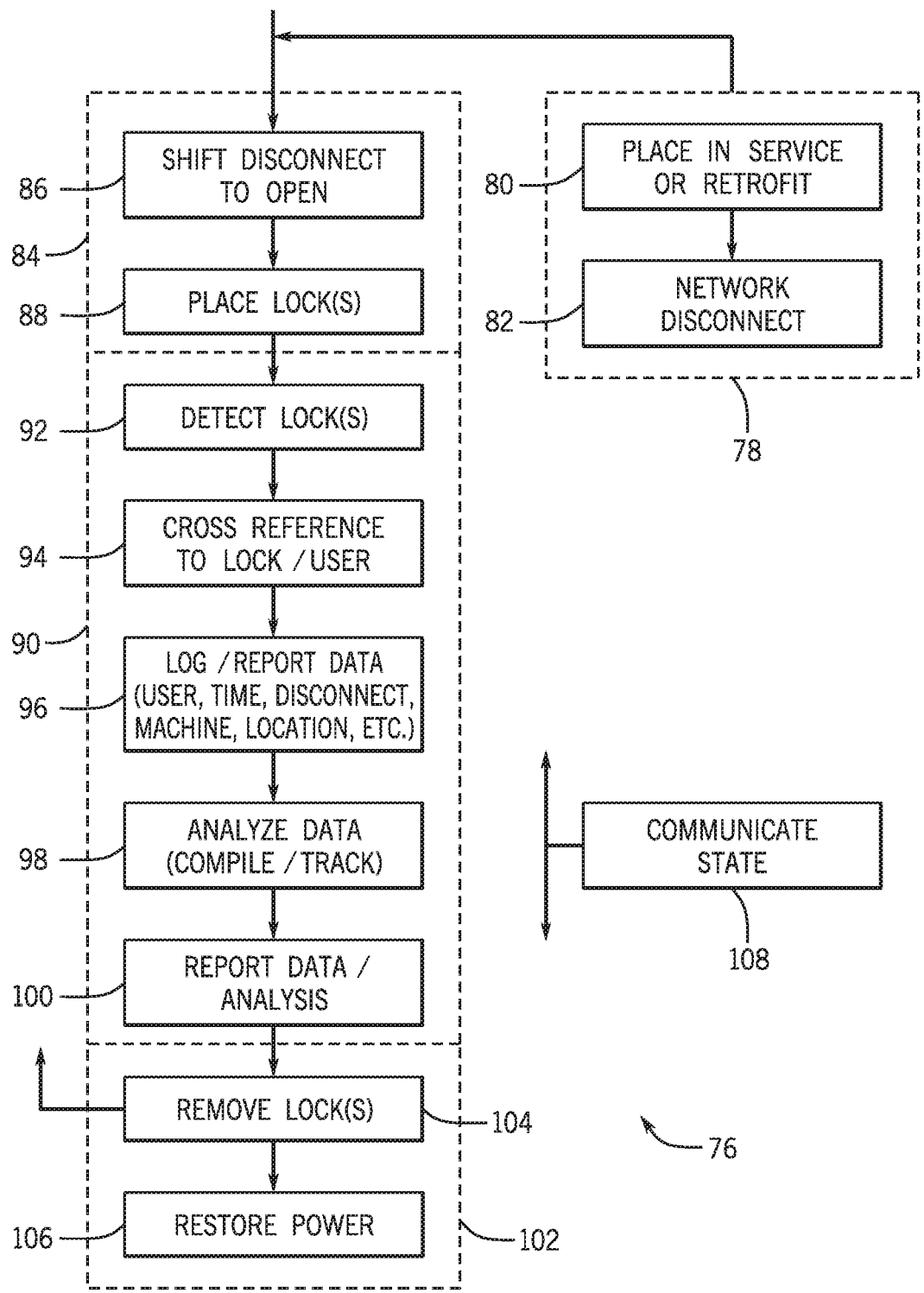
FIG. 3 is flow chart illustrating example logic for employing aspects of the disclosed techniques in a lockout tagout process.

FIG. 3 illustrates exemplary logic 76 for automated logging of the lockout tagout process. In the flowchart of FIG. 3, a setup phase 78 begins with either placing in service a new disconnect 12 or retrofitting an existing disconnect (step 80). After installation or retrofit of the disconnect 12 for the machine/process 14, the disconnect may then be connected to the network 46 for communication with the monitoring circuitry 50 (step 82). When service or shutdown is required, the lockout phase 84 consists of shifting the disconnect 12 to an open state (step 86), and placing one or more locks 26 and/or tags 28 on the disconnect (step 88). A monitoring phase 90 begins with detection of the locks 26 and/or tags 28 by the detection circuitry 32 (step 92). Once identification of the locks 26 and/or tags 28 has been accomplished, cross reference of each identification with a user (e.g., worker's name, employee number, etc.) may be made by processing circuitry 52 (step 94). A log may then be created indicating at least one of the user, time, date, disconnect 12, machine/process 14, location, or other desired attributes (step 96). After logging, other operations such as analyzing, compiling, and tracking of the data may be done by monitoring circuitry 50 (step 98). Reports of the analyzed data may then be displayed in a selected manner (step 100). When service of the machine/process 14 is complete, a restore phase 102 includes removing the locks 26 and/or tags 28 (step 104), and restoring power (step 106). In many applications it will be desirable that after the setup phase 78, the disconnect 12 may be in a constant or periodic communication state 108 regardless of disconnect 12, lock 26, or tag 28 status (or communication of status may be based, for example, upon a change of state of the disconnect). This communication between the detection circuitry 32 and the monitoring circuitry 50 may include data such as whether the disconnect 12 is open or closed, what locks 26 and/or tags 28 are present at the disconnect, if any, and the current date and time. As stated above, processing and memory functions may be accomplished at the disconnect 12, at the monitoring circuitry 50, or both.

Reports may be generated from the monitoring circuitry 50 automatically or on demand by a user (e.g., administrator, safety advisor, or worker). Reports may also be customized by the user to show only desired information. FIG. 4 illustrates a sample lockout tagout report 110 showing multiple lockout tagout events 112. The events 112 may display dates and times 114, and show when a disconnect or a machine/process 14 was locked out, when the lock was removed, a disconnect or machine/process identifier 116, and identify the employee 118 involved. If desired, the report 110 may also include not only the time of locking and unlocking of the disconnect 12, but also the time of actual opening and closing of the disconnect. In addition to or as an alternative to the machine/process identifier 118, the report 110 may also itemize individual disconnects 12, should a single machine/process 14 have more than one disconnect.

Figure 5:
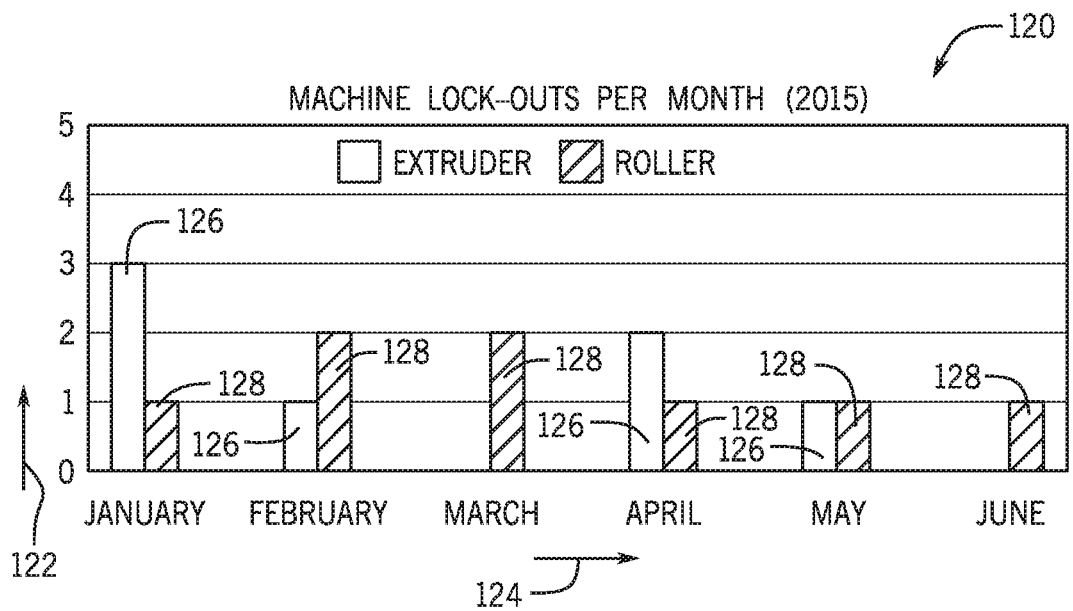
FIG. 5 is an example bar graph illustrating an analysis of data received by utilizing aspects of the disclosed techniques.

Additionally, custom graphs may also be created automatically or on demand by a user. FIG. 5 illustrates a machine/process graph 120 displaying the number of lockout events on the vertical axis 122 and time on the horizontal axis 124. In the machine/process graph 120, two machines, an extruder and a roller, are used as example machine/processes 14 that require lockouts when serviced. For each month in the graph 120, the number of extruder lockouts 126 and the number of roller lockouts 128 are displayed.

Figure 6:
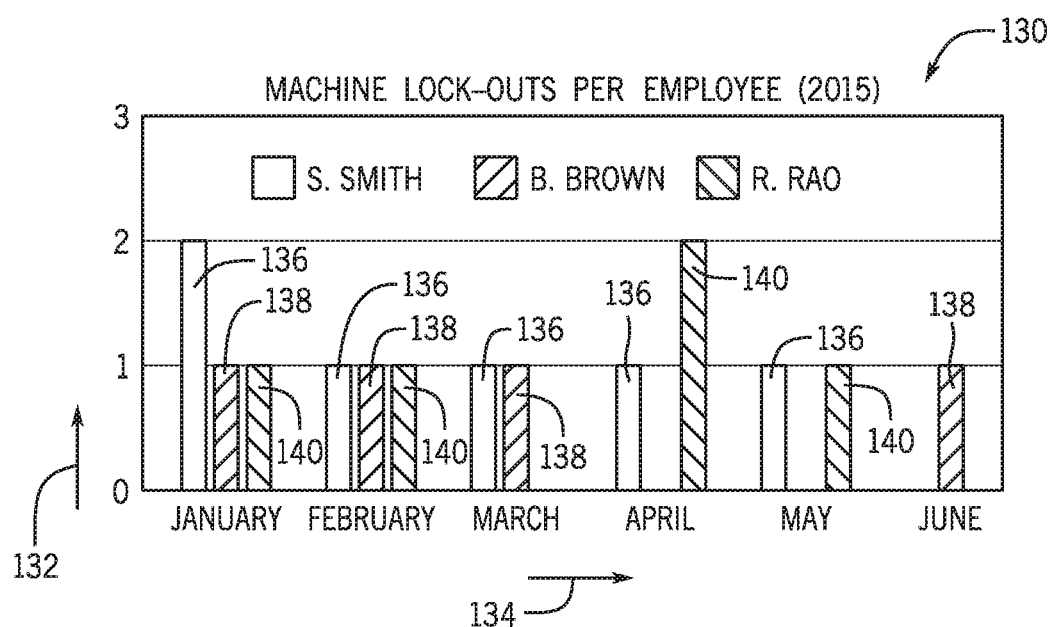
FIG. 6 is another example bar graph illustrating an analysis of data received by utilizing aspects of the disclosed techniques.

Another example of custom graphs may be in the form of an employee lockout graph 130. FIG. 6 illustrates an employee lockout graph 130 displaying the number of lockout events on the vertical axis 132 and time on the horizontal axis 134. The employee lockout graph 130 uses for example three different employees, and for each month in the graph, the number of total lockouts for S. Smith 136, B. Brown 138, and R. Rao 140 are shown in bar form. It should be noted that the reports and graphs shown in FIGS. 4-6 are examples of displaying the lockout tagout data and do not limit the scope of data obtainable through an automated logging feature of a disconnect 12.

The customized reports and graphs may be utilized to improve efficiency, documentation, and safety. The continuous communicate state 108 of a disconnect 12 allows real time insight of maintenance by managers, safety personnel, and environmental health and safety officers. Such insight, combined with custom reports of past events allows managers and other personnel to recognize deviations from norms, and take action accordingly. Also, the logging of lockout tagout documentation would be instantaneous rather than rely on manual entry. If, for example, a machine/process 14 has already had power restored after service, but the status has not yet been reported, other workers or machines/processes that rely on the first machine/process may be held in a standstill until the manual status entry is available. Real time status updates may greatly reduce such idle time. Not only is the data logged automatically and therefore much quicker, but the system-tracked data is also less prone to omission, data entry, or other errors.

Different industries, companies, and individual machines may have specific lockout tagout proceedings and requirements in place, and this disclosure does not nullify or suggest altering such proceedings. However, as will be appreciated by those skilled in the art, the embodiments of the present disclosure may be adapted to multiple industries, companies, and the specific lockout tagout requirements of some machines.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
 a manually operated disconnect;
 a plurality of locks, wherein each lock of the plurality of locks is configured to be affixed to the manually operated disconnect simultaneously and maintain the manually operated disconnect in an electrically open state;
 a plurality of electronic tags, wherein each electronic tag of the plurality of electronic tags is separate from a corresponding lock of the plurality of locks and associated with the manually operated disconnect being in the electrically open state, wherein each electronic tag of the plurality of electronic tags is associated with a corresponding user;
 a sensor, separate from the plurality of locks, configured to automatically detect, via wireless communication, the plurality of electronic tags in response to the plurality of electronic tags being placed within range of the sensor;
 processing circuitry coupled to the sensor and configured to determine respective lockout data for each electronic tag of the plurality of electronic tags, wherein the lockout data for each electronic tag of the plurality of electronic tags comprises identification of the corresponding user, a time of application of the corresponding lock to the manually operated disconnect by the corresponding user, data identifying or locating the manually operated disconnect or a machine to which the manually operated disconnect provides power when in an electrically closed state based on the electronic tag, or a combination thereof; and
 memory circuitry coupled to the processing circuitry to store the lockout data.

2. The system of claim 1, wherein the wireless communication between the sensor and an electronic tag of the plurality of electronic tags is based on radio frequency identification.

3. The system of claim 1, wherein the wireless communication between the sensor and an electronic tag of the plurality of electronic tags is based on near field communication.

4. The system of claim 1, wherein the wireless communication between the sensor and an electronic tag of the plurality of electronic tags is based on a IEEE 802.15.1 standard.

5. The system of claim 1, wherein the sensor is configured to detect a wireless and passive identifying element of an electronic tag of the plurality of electronic tags.

6. The system of claim 1, wherein the processing circuitry is configured to aggregate the lockout data of each electronic tag of the plurality of electronic tags with respect to the corresponding user and generate a visualization comprising the aggregated lockout data.

7. The system of claim 1, wherein the processing circuitry is configured to aggregate the lockout data for the manually operated disconnect and a plurality of other manually operated disconnects with respect to the disconnect or the machine and configured to generate a visualization of the aggregate lockout data.

8. A system comprising:
a sensor retrofittable onto an in-service manual disconnect and configured to automatically detect, via wireless communication, an electronic lockout tag affixed to the in-service manual disconnect within a range of the sensor, wherein the electronic lockout tag is associated with a lock that locks the in-service manual disconnect in an open state, and wherein the electronic lockout tag is configured to be affixed to the in-service manual disconnect separately from the lock, and wherein the sensor is configured to be affixed to the in-service manual disconnect separately from the lock;
processing circuitry commutatively coupled to the sensor and configured to determine lockout data based on detection of the electronic lockout tag, wherein the lockout data comprises an identification of a user associated with the electronic lockout tag, a time of application of the lock to the in-service manual disconnect, data identifying or locating the in-service manual disconnect or a machine to which the disconnect provides power when in a closed state, or a combination thereof; and
memory circuitry coupled to the processing circuitry and configured to store the lockout data.

9. The system of claim 8, wherein the wireless communication between the sensor and the electronic lockout tag is based on radio frequency identification.

10. The system of claim 8, wherein the wireless communication between the sensor and the electronic lockout tag is based on near field communication.

11. The system of claim 8, wherein the wireless communication between the sensor and the electronic lockout tag is based on a IEEE 802.15.1 standard.

12. The system of claim 8, comprising a network link configured to transmit the lockout data to a remote system via a network.

13. The system of claim 12, wherein the network link is configured to transmit the lockout data via a hard-wired connection.

14. A method comprising:
receiving, via a processor, an indication of a presence of a plurality of electronic lockout tags, wherein the indication is sent from a wireless sensor, wherein each electronic lockout tag of the plurality of electronic lockout tags is associated with a corresponding lock of a plurality of locks affixed to a disconnect, wherein each lock of the plurality of locks is configured to lock the disconnect in an open state, wherein each electronic lockout tag of the plurality of electronic lockout tags is separate from the corresponding lock, and wherein the wireless sensor is separate from the plurality of locks;
determining, via the processor, based on the indication of the presence of the plurality of electronic lockout tags at the disconnect, lockout data for each electronic lockout tag of the plurality of electronic lockout tags, wherein the lockout data, for each of the plurality of electronic lockout tags, comprises identification of a user associated with a respective electronic lockout tag, a time of application of the corresponding lock to the disconnect, data identifying or locating the disconnect or a machine to which the disconnect provides power when in a closed state, or a combination thereof; and
storing, via the processor, the lockout data.

15. The method of claim 14, wherein wireless communication between the wireless sensor and the plurality of electronic lockout tags is based on radio frequency identification.

16. The method of claim 14, comprising aggregating the lockout data over time and generating a visualization of the aggregated lockout data.

17. The method of claim 14, comprising aggregating the lockout data for a plurality of other disconnects and generating a visualization of the aggregated lockout data.

18. The method of claim 14, comprising transmitting a lockout state of the disconnect to a remote monitoring system based upon receiving the indication of the plurality of electronic lockout tags.

* * * * *